United States Patent
Tymchenko

[11] Patent Number: 6,026,231
[45] Date of Patent: Feb. 15, 2000

[54] METHOD AND APPARATUS FOR SELECTING AN OPTIMAL SYSTEM BUS CLOCK IN A HIGHLY SCALABLE COMPUTER SYSTEM

[75] Inventor: Viktor A. Tymchenko, Beaverton, Oreg.

[73] Assignee: Intel Corporation, Santa Clara, Calif.

[21] Appl. No.: 08/998,147

[22] Filed: Dec. 24, 1997

Related U.S. Application Data

[63] Continuation of application No. 08/414,290, Mar. 31, 1995, abandoned.

[51] Int. Cl.[7] .................................................. G06F 1/08
[52] U.S. Cl. ............................................................. 395/556
[58] Field of Search .............................................. 395/556

[56] References Cited

U.S. PATENT DOCUMENTS

| | | |
|---|---|---|
| 5,092,280 | 3/1992 | Wunner et al. . |
| 5,263,172 | 11/1993 | Olnowich . |
| 5,448,715 | 9/1995 | Lelm et al. . |
| 5,459,855 | 10/1995 | Lelm . |
| 5,491,814 | 2/1996 | Yee et al. . |

*Primary Examiner*—Dennis M. Butler
*Attorney, Agent, or Firm*—Blakely, Sokoloff, Taylor & Zafman

[57] ABSTRACT

An oscillator output selector and complementary control circuitry are provided to a computer system. The oscillator output selector is used to select a series of clock pulses for usage as system bus clock. The control circuitry controls the selection being made by the oscillator output selector, in accordance to control inputs received. In one embodiment, the control circuitry receives system bus clock frequency preferences from the CPU boards as control inputs, and in response, the control circuitry causes the oscillator output selector to select the series of clock pulses having a frequency that is equal to or slower than the slowest preferred frequency. In an alternate embodiment, the control circuitry receives CPU types from the CPU boards as control inputs, and in response, the control circuitry causes the oscillator output selector to select a series of clock pulses having a frequency that will allow maximum total CPU clock frequency utilization.

31 Claims, 4 Drawing Sheets

METHOD AND APPARATUS FOR SELECTING AN OPTIMAL SYSTEM BUS CLOCK IN A HIGHLY SCALABLE COMPUTER SYSTEM

This application is a continuation of U.S. patent application Ser. No. 08/414,290 filed Mar. 31, 1995, now abandoned.

BACKGROUND OF THE INVENTION

1. Field of the Invention

The present invention relates to the field of computer systems. More specifically, the present invention relates to scaling of central processing unit (CPU) and system bus clock frequencies of computer systems.

2. Background Information

Scalability of a system product line is often critical to its success. Superior scalability allows a system product line to have multiple models optimized for different performance design points over a wide performance spectrum to be cost effectively manufactured. Additionally, purchasers may start with the lower cost low end performance models, and grow their systems as their computing requirements increase.

Thus, a well designed modern server system often would offer a choice for the number of CPUs to be employed. Many of these well designed server systems also would offer a choice or choices for the CPU clock frequency or frequencies. In order to accommodate the different potential CPU clock frequencies, the system bus would be designed to operate in one of a number of complementary clock frequencies. The selection of the CPU and system bus clock frequencies would be predetermined and set via jumpers.

Under this prior art approach, changing the CPU and system bus clock frequencies would require the jumpers to be reset, a task typically performed by a skilled technician. As the rate of CPU clock frequency improvement continues to outpace the system bus clock frequency, the requirement to maintain certain ratio or ratios between the CPU clock frequency or frequencies and the system bus clock frequency further complicates the task. As the choices for CPU and system bus clock frequencies as well as the number of CPUs included in a system increase, the large number of possible combinations from which the optimal selection must be chosen has made the task extremely difficult to be performed manually.

For example, if a server system would allow the employment of 1–4 CPUs having 1–2 clock frequencies to be selected from 3 clock frequencies (e.g. 100, 180, 200 MHz), and a system bus having a clock frequency to be selected from 3 other clock frequencies (e.g. 50, 60 and 66 MHz), with the ratio of any CPU clock frequency to system bus clock frequency to be one of 4 choices (2:1, 3:1, 4:1, and 5:1), the optimal selection will have to made from almost 100 possible combinations.

Thus, it is desirable to have a more efficient and a more reliable way for selecting an optimal system bus clock frequency for a highly scalable computer system. As will be disclosed in more detail below, the present invention achieves these and other desired results.

SUMMARY OF THE INVENTION

An oscillator output selector and complementary control circuitry are provided to a computer system. The oscillator output selector is used to select a series of clock pulses for usage as the system bus clock. The series of clock pulses has a frequency that is optimal for the CPU(s) present. The control circuitry controls the selection being made by the oscillator output selector in accordance to control inputs received.

In one embodiment, the control circuitry receives system bus clock frequency preferences from the CPU boards as system bus clock selection control inputs, and in response, the control circuitry causes the oscillator output selector to select the series of clock pulses having a frequency that is equal to or slower than the slowest preferred frequency. The system bus clock frequency preferences are encoded and prestored in the CPU boards, and output at system reset. Additionally, CPU clock frequency to system bus clock frequency ratios are also encoded and prestored in the CPU boards, and provided to the on board CPU(s) at system reset.

In an alternate embodiment, the control circuitry receives CPU types from the CPU boards as control inputs, and in response, the control circuitry causes the oscillator output selector to select a series of clock pulses having a frequency that will allow the computer system to maximize the total CPU clock frequencies utilized. The CPU types corresponds to CPU maximum operating frequency and base system bus operating frequency pairs. Furthermore, the CPU types are prestored in the CPU boards and output at system reset. The system bus clock frequency that will maximize the total CPU clock frequency utilization for a particular combination of CPU clock frequencies is predetermined and encoded, and the encodings are prestored in the control circuitry. Under this embodiment, CPU clock frequency to system bus clock frequency ratios are also encoded and prestored in the control circuitry, and provided to the on board CPU(s) at system reset.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
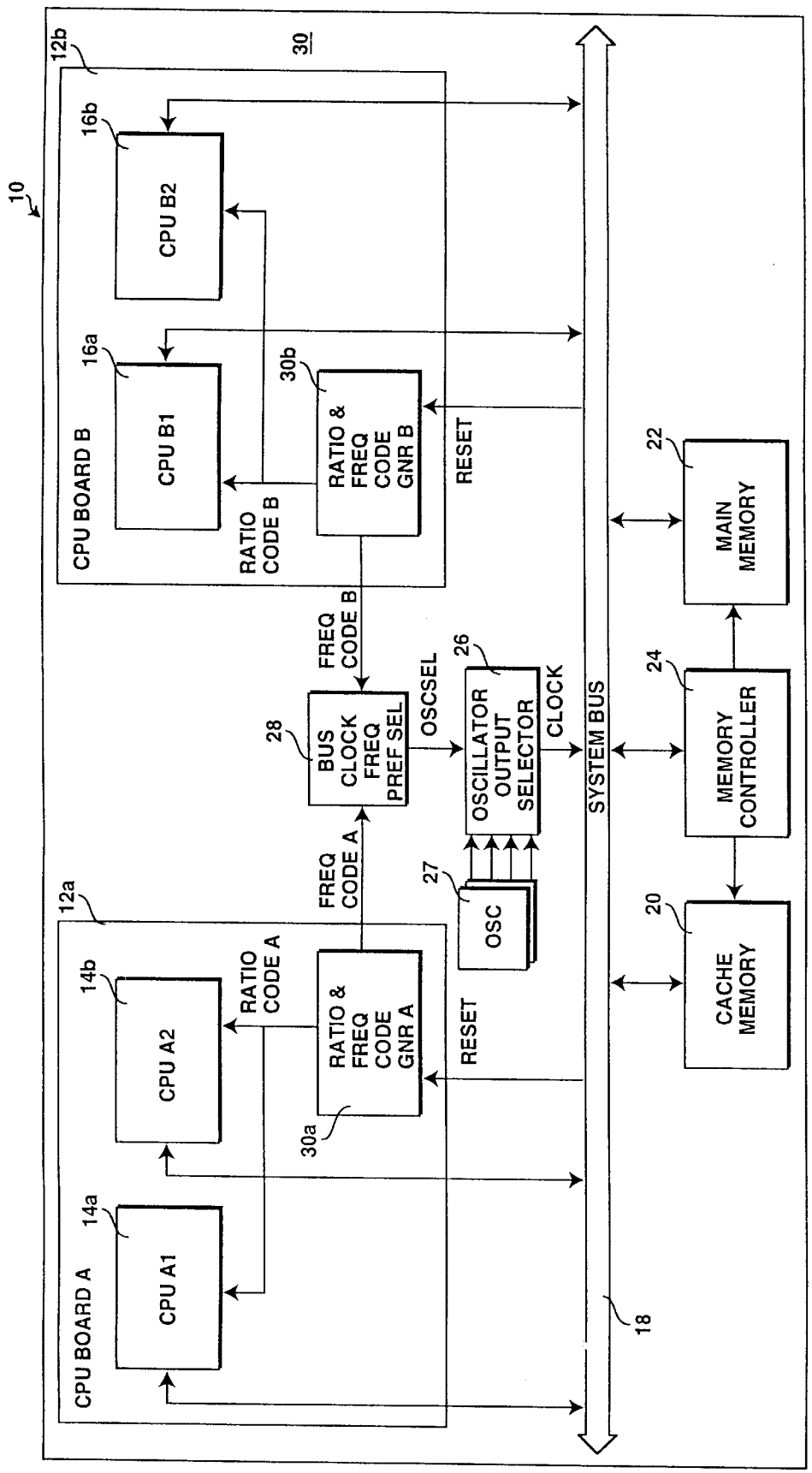
FIG. 1 illustrates an exemplary computer system incorporating one embodiment of the present invention.

Referring now to FIG. 1, a first exemplary computer system incorporated with a first embodiment of the present invention is illustrated. As shown, first exemplary computer system 10 comprises CPU boards 12*a* and 12*b* having CPUs 14*a* and 14*b* of a first type and CPUs 16*a* and 16*b* of a second type. CPUs 14*a* and 14*b* have a first maximum clock frequency, whereas CPUs 16*a* and 16*b* have a second maximum clock frequency. First exemplary computer system 10 also comprises system bus 18, cache memory 20, main memory 22 and memory controller 24 coupled to each other and to CPU boards 12a and 12b as shown. Additionally, in accordance to the present invention, first exemplary computer system 10 further comprises oscillators 27, oscillator output selector 26 and complementary control circuitry, which is a bus clock frequency preference selector 28 under this embodiment. Oscillators 27, Oscillator output selector 26 and bus clock frequency preference selector 28 are disposed on the motherboard 30 of first exemplary computer system 10. Furthermore, under this embodiment, CPU boards 12a and 12b are to also include ratio and frequency code generators 30a and 30b.

Except for the teachings of the present invention, CPU boards 12a and 12b, CPUs 14a–14b and 16a–16b, system bus 18, cache memory 20, main memory 22 and memory controller 24 perform their conventional functions, which are well known, and the constitutions of these elements are also well known. Thus, these elements will not be otherwise further described.

Oscillators 27 are used to output multiple series' of clock pulses having different clock frequencies, e.g. 66 MHz, 50 MHz, and so forth. Oscillator output selector 26 is used to select one of these series' of clock pulses whose clock frequency would be optimal for CPUs 14a–14b and 16a–16b. The clock pulses are provided to the oscillator output selector 26 at predetermined input terminals. In other words, the oscillator output selector 26 can rely on the fact that the clock pulses output by a 66 MHz oscillator are provided at a first input terminal, whereas the clock pulses output by a 50 MHz oscillator are provided at a second input terminal, and so forth. Oscillator output selector 26 makes its selection in accordance to control signal OSCSEL provided by control circuitry or bus clock frequency preference selector 28 under this embodiment.

Control circuitry, or bus clock frequency preference selector 28 under this embodiment, outputs OSCSEL to control the selection being made by oscillator output selector 26, in accordance to control inputs received. Bus clock frequency preference selector 28 receives encoded system bus clock frequency preferences from CPU boards 12a and 12b as control inputs, and in response, bus clock frequency preference selector 28 outputs OSCSEL in accordance to the lowest bus clock frequency preference denoted, thereby causing oscillator output selector 26 to select the series of clock pulses having a frequency that is equal to or slower than the slowest preferred frequency.

The system bus clock frequency preferences are encoded and prestored in ratio and frequency code generators 30a and 30b of CPU boards 12a and 12b. The system bus clock frequency preference encodings are output by ratio and frequency code generators 30a and 30b at system reset. Additionally, CPU clock frequency to system bus clock frequency ratios are also encoded and prestored in ratio and frequency code generators 30a and 30b of CPU boards 12a and 12b. The CPU clock frequency to system bus clock frequency ratio encodings are also output and provided to on board CPUs 14a–14b and 16a–16b by ratio and frequency code generators 30a and 30b at system reset.

Figure 2:
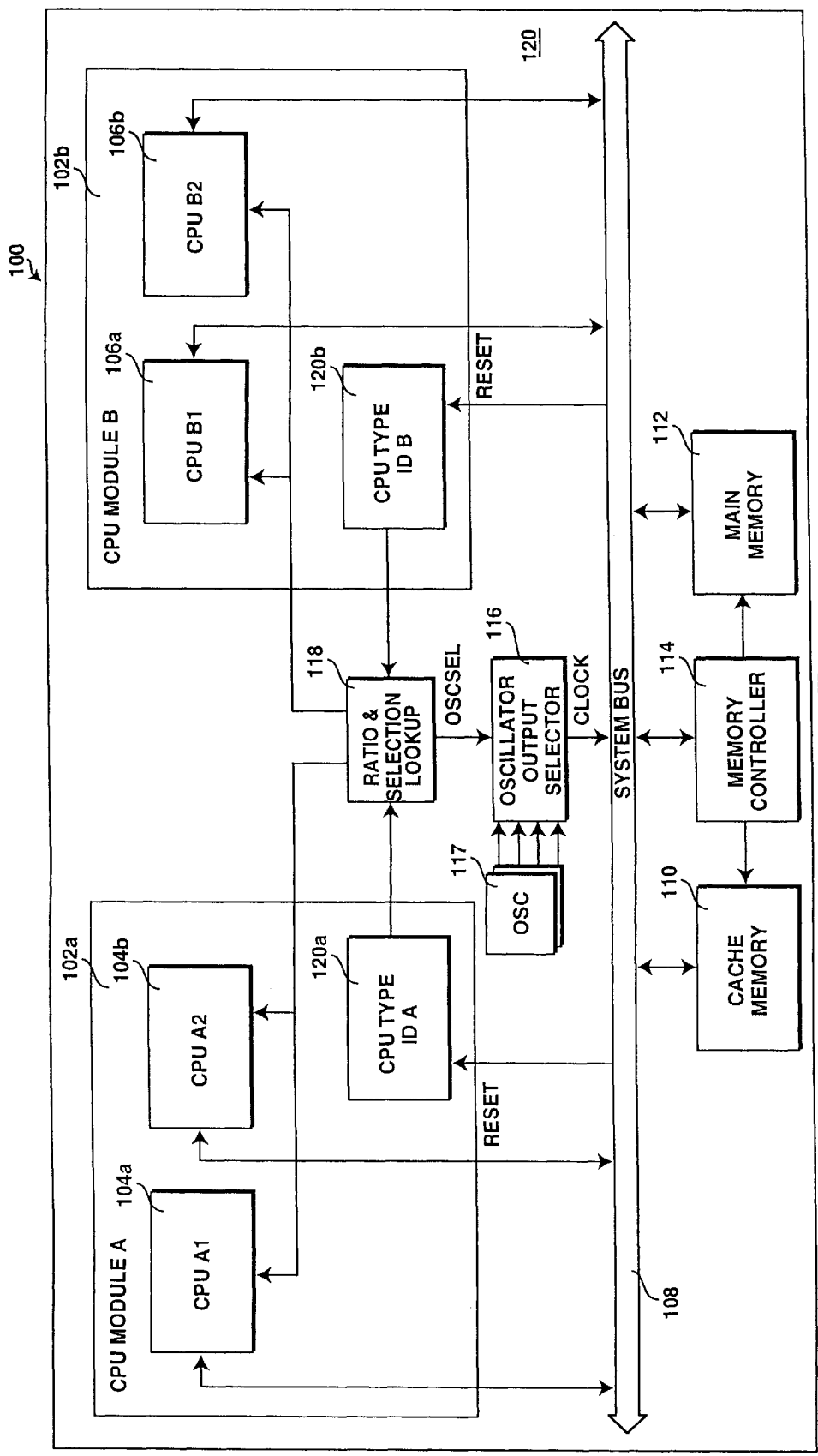
FIG. 2 illustrates an exemplary computer system incorporating an alternate embodiment of the present invention.

Referring now to FIG. 2, a second exemplary computer system incorporated with a second embodiment of the present invention is illustrated. As shown, second exemplary computer system 100 comprises CPU boards 102a and 102b having CPUs 104a and 104b of a third type and CPUs 106a and 106b of a fourth type. CPUs 104a and 104b have a third maximum clock frequency, whereas CPUs 106a and 106b have a fourth maximum clock frequency. Second exemplary computer system 100 also comprises system bus 108, cache memory 110, main memory 112 and memo controller 114 coupled to each other and to CPU boards 102a and 102b as shown. Additionally, in accordance to the present invention, second exemplary computer system 100 further comprises oscillators 117, oscillator output selector 116 and complementary control circuitry, which is a ratio and selection look-up circuit 118 under this embodiment. Oscillators 117, oscillator output selector 116 and ratio and selection look-up circuit 118 are disposed on motherboard 120 of exemplary computer system 100. Furthermore, under this embodiment, CPU boards 102a and 102b are to also include CPU type output circuits 120a and 120b.

Similarly, except for the teachings of the present invention, CPU boards 102a and 102b, CPUs 104a–104b and 106a–106b, system bus 108, cache memory 110, main memory 112 and memory controller 114 perform their conventional functions, which are well known, and the constitutions of these elements are also well known. Thus, these elements will not be otherwise further described.

In like manner, oscillators 117 output multiple series of clock pulses having different clock frequencies, e.g. 66 MHz, 50 MHz, and so forth. Oscillator output selector 116 is used to select one of these series' of clock pulses whose clock frequency would be optimal for CPU 104a–104b and 106a–106b as well as for system bus 108. The clock pulses are provided to the oscillator output selector 116 at predetermined input terminals. In other words, The oscillator output selector 116 can rely on the fact that the clock pulses output by a 66 MHz oscillator are provided at a first input terminal, whereas the clock pulses output by a 50 MHz oscillator are provided at a second input terminal, and so forth. Oscillator output selector 116 makes its selection in accordance to control signal OSCSEL provided by ratio and selection look-up circuit 118 under this embodiment.

Control circuitry, or ratio and selection look-up circuit 118 under this embodiment, outputs OSCSEL to control the selection being made by oscillator output selector 116, and CPU clock frequency to system bus clock frequency ratios to on board CPUs 104a–104b and 106a–106b, in accordance to control inputs received. Ratio and selection look-up circuit 118 receives CPU types from CPU boards 102a–102b as control inputs. The CPU types correspond to CPU maximum operating frequency and base system bus operating frequency pairs. For example, CPU type X corresponds to a CPU having a maximum operating frequency of 180 MHz and a base system bus operating frequency of 60 MHz. Furthermore, CPU types are prestored in CPU type output circuits 120a–120b of CPU boards 102a–102b, and output at system reset. Optimal system bus clock frequencies and optimal CPU clock frequency to system bus ratios for the various CPU clock frequency combinations are predetermined, encoded, and the encodings are prestored in ratio and selection lookup circuit 118. As will be described in more detail below, under one approach, the optimal system bus clock frequency and the optimal CPU clock frequency to system bus clock frequency ratio are determined based on maximized total CPU clock frequency utilization. Thus, ratio and selection lookup circuit 118 causes oscillator output selector 116 to select the series of clock pulses having a clock frequency that will allow exemplary computer system 100 to maximize the total CPU clock frequencies utilized.

Figure 3:
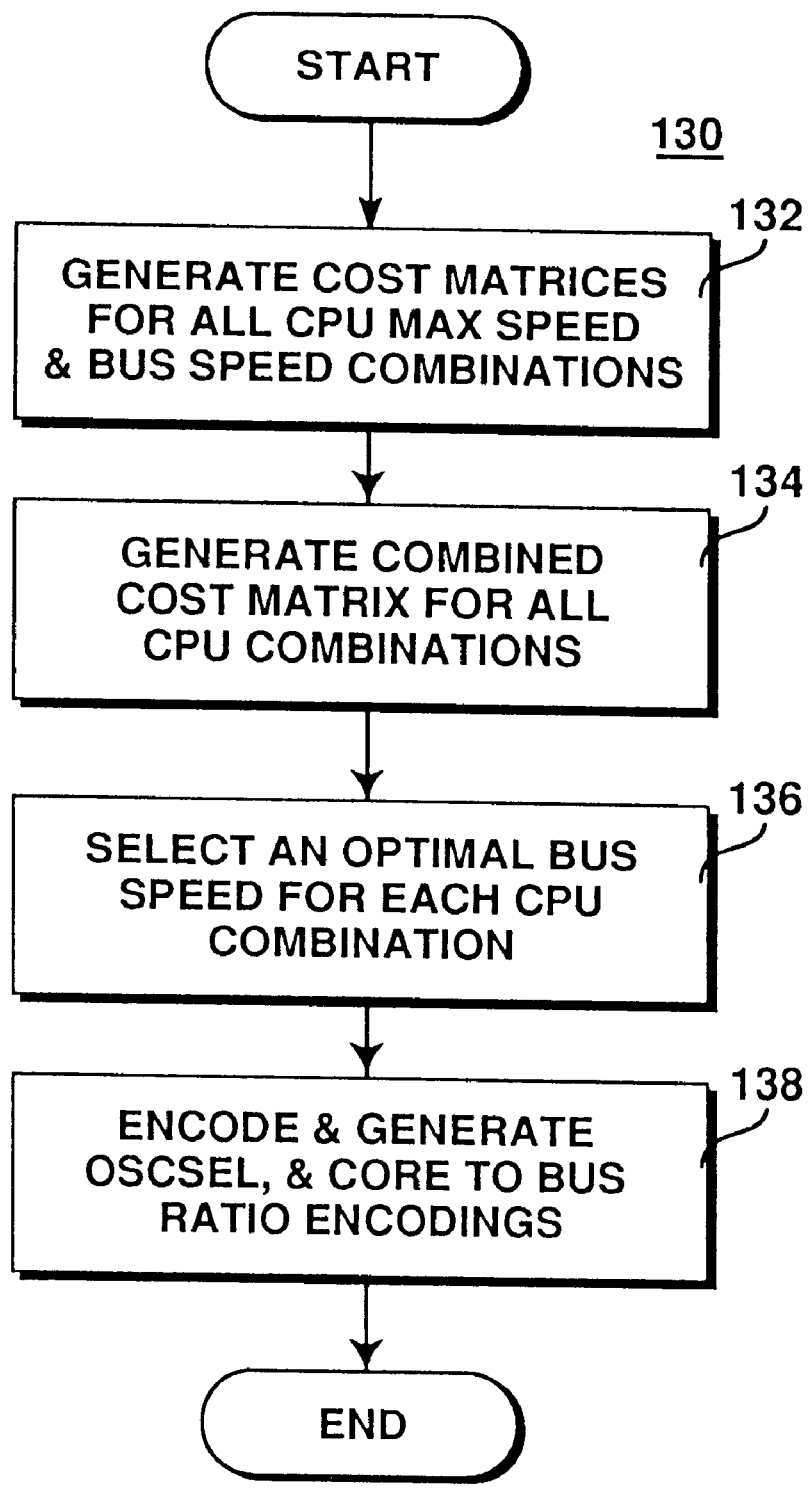
FIGS. 3 & 4 illustrate a maximized total CPU clock frequency utilization approach to determining the optimal system bus clock frequencies for various CPU clock frequency combinations.
Figure 4:
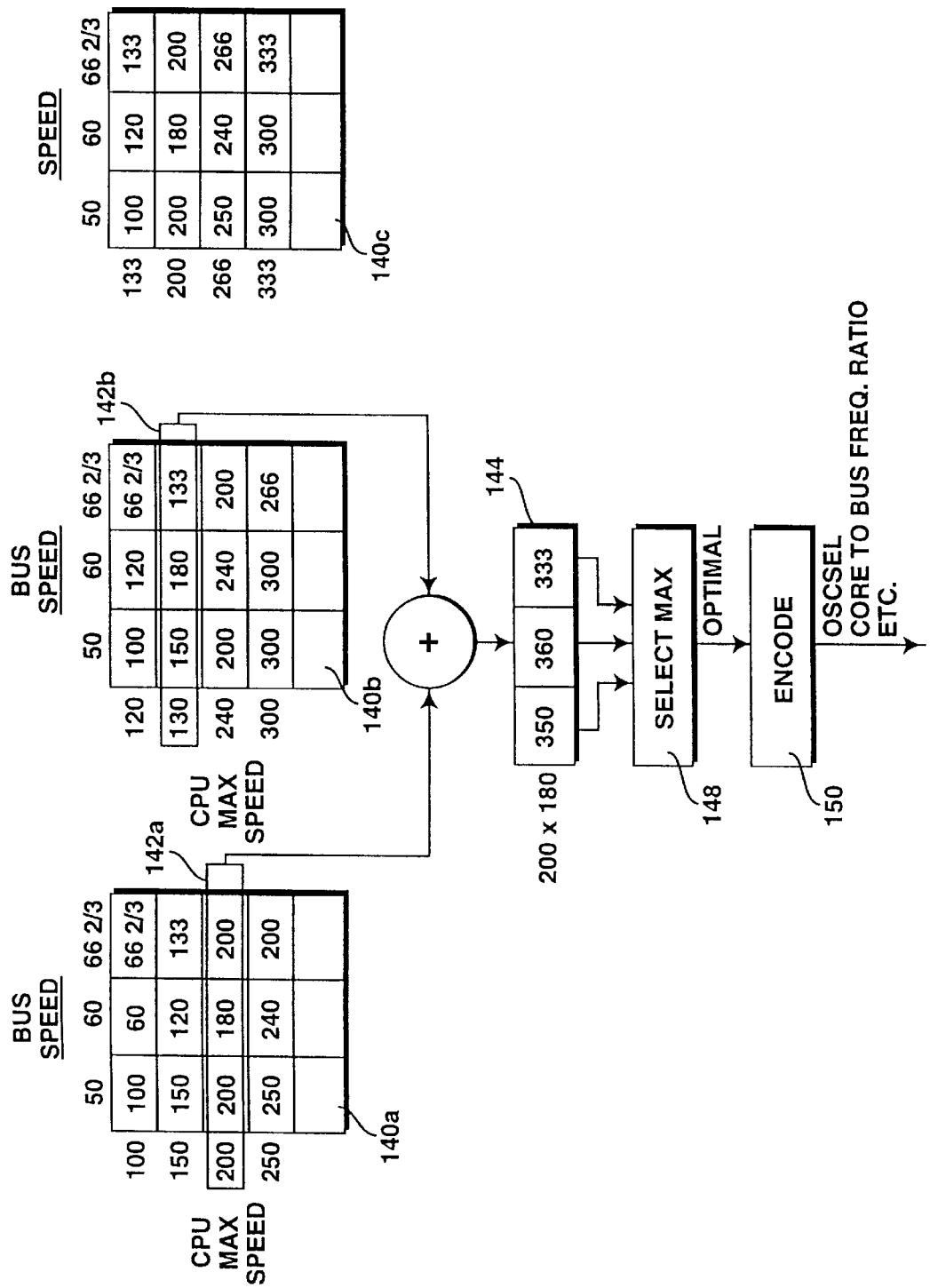

Referring now to FIGS. 3 & 4, the maximized total CPU clock frequency utilization approach to determining optimal system bus clock frequencies and optimal CPU clock frequency to system bus clock frequency ratios is illustrated. As shown in FIG. 3, under this approach, the first step is to generate the CPU clock frequency utilizations for all CPU clock frequency and system bus clock frequency combinations presently supported and expected to be supported in the product life of the particular family of CPUs, step 132. Preferably, as shown in FIG. 4, they are generated in a matrix form. In fact, preferably they are generated using multiple utilization matrices 140a–140c. For example, utilization matrix 140a contains the CPU clock frequency utilizations for CPU clock frequencies 100 MHz, 150 MHZ etc. when operated in conjunction with system bus clock uencies of 50 MHz, 60 MHz, and 66 MHz, utilization matrix 140b contains the clock frequency utilizations for CPU clock frequencies 120 MHz, 180 MHz, and so forth. More specifically, for a CPU clock frequency of 180 MHz, 150 MHz, 180 MHz, and 133 MHz of CPU clock frequencies will be utilized, depending on whether the system bus clock frequency is 50 MHz, 60 MHz or 66 MHz, since at most the CPU can operate at 3×, 3×, and 2× of the system bus frequency.

Referring back to FIG. 3, next, a total CPU clock frequency utilization matrix covering all CPU clock frequency combinations is generated, step 134. As shown in FIG. 4, each row of the total utilization matrix will contain the total CPU clock frequency utilizations 144 for a particular CPU clock frequency combination. For example, the CPU clock frequency utilizations 142a for CPU clock frequency 200 MHz and the CPU clock frequency utilizations 142b for CPU clock frequency 180 MHz are combined to generate the total CPU clock frequency utilizations 144 for the CPU clock frequency combination of 200 MHz×180 MHz. More specifically, if the CPU clock frequencies are 200 MHz and 180 MHz, and the system bus clock frequencies are 50 MHz, 60 MHz and 66 MHz respectively, the total CPU clock frequency utilizations 144 would be 350 MHz, 360 MHz and 333 MHz respectively.

Again, referring back to FIG. 3, having generated the total CPU clock frequency utilization matrix, an optimal system bus frequency is selected for each CPU clock frequency combination by selecting the maximum total CPU clock frequency utilization, step 136. For example, as shown in FIG. 4, upon comparing the total CPU clock frequency utilizations for CPU clock frequency combination of 200× 180, 60 MHz would be selected as the optimal system bus frequency, since only a total of 360 MHz of CPU clock frequency would be utilized.

Accordingly, as shown in FIGS. 3 & 4, the optimal system bus clock frequency and the corresponding CPU clock frequency to system bus clock frequency ratios are encoded, and the encodings are prestored into the ratio and selection lookup circuitry 118, step 138. For example, for the 200 MHz and 180 MHz combination, a selection code for selecting the oscillator generating clock pulses having a frequency of 60 MHz, and codes denoting the CPU clock frequency to system bus clock frequency ratios to be 3:1 in both cases are prestored into the ratio and selection lookup circuitry 118.

The above described maximized total CPU clock frequency utilization approach to determining the optimal system bus clock frequencies and CPU clock frequency to system bus clock frequency ratios for various CPU clock frequency combinations may be implemented in software, using any number of well known programming language, including but not limited to C, on any number of well known computer systems, including but not limited to Pentium® processor based computer systems. Pentium is a registered trademark of Intel Corporation.

Thus, a method and apparatus for selecting an optimal system bus frequency in a highly scalable computer system has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. In particular, the present invention may be practiced on computer systems with more or less CPU boards, each having more or less CPUs per board. The description is thus to be regarded as illustrative instead of restrictive on the present invention.

What is claimed is:

1. A central processing unit (CPU) circuit board comprising a CPU and first circuitry for outputting, at system reset time, control inputs to a system bus clock selection circuit operative to select an appropriate system bus clock from a plurality of available system bus clocks at the system reset time for a system bus, wherein the control inputs include the type of CPU, and wherein the system bus clock selection circuit and the system bus being coupled to each other and elements of a computer system within which the CPU circuit board is integrated.

2. The CPU circuit board as set forth in claim 1, wherein, the first circuitry outputs at system reset time system bus clock frequency preference information as control inputs.

3. The CPU circuit board as set forth in claim 1, wherein, the first circuitry outputs at system reset time CPU clock frequency information as control inputs.

4. The CPU circuit board as set forth in claim 3, wherein, the first circuitry implicitly outputs the CPU clock frequency information by outputting CPU type information having direct correspondence to a maximum CPU operating frequency and a companion base system bus operating frequency.

5. The CPU circuit board as set forth in claim 1, wherein the CPU circuit board further comprises second circuitry for simultaneously outputting CPU clock frequency to system bus clock frequency ratio information to one or more CPUs installed on the CPU circuit board.

6. A computer system motherboard comprising:

a plurality of oscillators operative to generate a plurality of series of clock pulses having different frequencies; and an oscillator output selector coupled to the oscillators operative to select an appropriate one of the series of clock pulses to be used as a system bus clock of a system bus of a computer system within which the computer system motherboard is integrated, wherein the selection of the series of clock pulses is based, at least in part, on the type of central processing unit(s) (CPU) of the computer system.

7. The computer system motherboard as set forth in claim 6, wherein the computer system motherboard further comprises control circuitry coupled to the oscillator output selector for controlling the selection being made by the oscillator output selector, the control being exercised in accordance to control inputs the control circuitry receives from CPU board(s) of the computer system.

8. The computer system motherboard as set forth in claim 7, wherein the control circuitry receives preference information about system bus frequency from the CPU board(s) as control inputs; and the control circuitry causes the oscillator output selector to select a series of clock pulses having a frequency that is equal to or slower than the slowest preference received from the CPU board(s).

9. The computer system motherboard as set forth in claim 7, wherein
the control circuitry receives CPU frequency information from the CPU board(s) as control inputs; and
the control circuitry causes the oscillator output selector to select a series of clock pulses having a frequency that will allow the computer system to maximize total CPU clock frequency utilization, as the system bus clock, in view of the CPU frequency information received.

10. The computer system motherboard as set forth in claim 9, wherein the control circuitry receives the CPU frequency information implicitly through CPU type information received from the CPU board(s), the CPU type information having direct correspondence to maximum CPU operating frequencies and their companion base system bus operating frequencies.

11. The computer system motherboard as set forth in claim 9, wherein the control circuitry comprises circuit elements for pre-storing selection control signals to be output to the oscillator output selector for various CPU frequency combinations.

12. The computer system motherboard as set forth in claim 9, wherein the control circuitry further outputs at the same time CPU clock frequency to system bus clock frequency ratio information to CPU(s) on board the CPU board(s).

13. The computer system motherboard as set forth in claim 12, wherein the control circuitry comprises circuit elements for pre-storing CPU clock frequency to system bus clock frequency ratio information to be output to the CPU(s) on board the CPU board(s) for various CPU frequency combinations.

14. An apparatus comprising:
first circuitry operative to output at system reset time first control inputs; and
second circuitry coupled to the first circuitry operative to receive the first control inputs, and operative to select an appropriate system bus clock from a plurality of available system bus clocks for a system bus in accordance to the received first control inputs, the system bus clock having a clock frequency based, at least in part, on the type of processor(s) of a system, as defined by the received first control inputs, the system bus being coupled to the second circuitry, and the system bus being an element of the system within which the processor(s) and the apparatus are integrated.

15. The apparatus as set forth in claim 14, wherein,
the first circuitry outputs at system reset time processor(s) type information as the first control inputs; and
the second circuitry selects a series of clock pulses having a frequency that accommodates the slowest processor(s) populating the system as the system bus clock, as determined from the processor(s) type information.

16. The apparatus as set forth in claim 14, wherein,
the first circuitry outputs at system reset time processor type information as the first control inputs; and
the second circuitry selects a series of clock pulses having a frequency that will allow the system to maximize total processor frequency utilization, as the system bus clock, in view of the first processor type information received.

17. The apparatus as set forth in claim 16, wherein, the first circuitry implicitly outputs the first processor clock frequency information by outputting first processor type information having direct correspondence to a first processor frequency and a first companion base system bus frequency.

18. The apparatus as set forth in claim 14, wherein, the second circuitry comprises:
an oscillator output selector operative to select an appropriate one of a plurality of a series of clock pulses having different frequencies output by oscillators of the system, as the system bus clock; and
control circuitry coupled to the first circuitry and the oscillator output selector for receiving the first control inputs output by the first circuitry, and operative to control the selection being made by the oscillator output selector based, at least in part, on the received first control inputs.

19. The apparatus as set forth in claim 18, wherein
the control circuitry receives first preference information about system bus frequency from the first circuitry as the first control inputs; and
the control circuitry causes the oscillator output selector to select a series of clock pulses having a frequency that is equal to or slower than the slowest preference received from the first circuitry.

20. The apparatus as set forth in claim 18, wherein
the control circuitry receives first processor frequency information from the first circuitry as first control inputs; and
the control circuitry causes the oscillator output selector to select a series of clock pulses having a frequency that will allow the system to maximize total processor frequency utilization, as the system bus clock, in view of the first processor frequency information received.

21. The apparatus as set forth in claim 20, wherein the control circuitry comprises circuit elements for pre-storing selection control signals to be output to the oscillator output selector for various processor frequency combinations.

22. The apparatus as set forth in claim 18, wherein the control circuitry further outputs at the same time processor clock frequency to system bus clock frequency ratio information to processor(s) of the system.

23. The apparatus as set forth in claim 22, wherein the control circuitry comprises circuit elements for pre-storing processor clock frequency to system bus clock frequency ratio information to be output to the processor(s) of the system for various processor frequency combinations.

24. The apparatus as set forth in claim 14, wherein the first circuitry further outputs at the same time processor clock frequency to system bus clock frequency ratio information to one or more processors of the system.

25. The apparatus as set forth in claim 14, wherein,
the apparatus further comprises third circuitry for outputting at system reset time second control inputs;
the second circuitry is further coupled to the third circuitry for receiving the second control inputs, and selecting the system bus clock for the system bus in accordance with the received first and second control inputs, the system bus clock having a clock frequency that is optimal for processor(s) of a system, as defined by the received first as well as the second control inputs.

26. A computer system comprising;
a first CPU board having a CPU and first circuitry for outputting at system reset time first control inputs including processor(s) type information; and
a computer system motherboard coupled to the first CPU board having a system bus and system bus clock selection circuitry for selecting a system bus clock for the system based, at least in part, on the first control inputs received, wherein the system bus clock selection is optimal for resident CPU(s), as determined from the processor(s) type information.

27. The computer system as set forth in claim 26, wherein the first circuitry outputs first system bus frequency preference information as the first control inputs.

28. The computer system as set forth in claim 27, wherein the first circuitry further outputs at the same time CPU clock frequency to system bus clock frequency ratio information to one or more CPUs disposed on the first CPU board.

29. The computer system as set forth in claim 26, wherein the first circuitry outputs CPU frequency information as the first control inputs.

30. The computer system as set forth in claim 29, wherein the second circuitry further outputs at the same time CPU clock frequency to system bus clock frequency ratio information to one or more CPUs disposed on the first CPU board.

31. The computer system as set forth in claim 26, wherein the computer system further comprises a second CPU board having second circuitry for outputting at system reset time second control inputs; and the system bus clock selection circuitry further receives the second control inputs from the second CPU board and selects the system bus clock based at least in part, on the second inputs received.

* * * * *

UNITED STATES PATENT AND TRADEMARK OFFICE
CERTIFICATE OF CORRECTION

PATENT NO. : 6,026,231
DATED : February 15, 2000
INVENTOR(S) : Tymchenko It is certified that error appears in the above-identified patent and that said Letters Patent is hereby corrected as shown below:

In column 5, at line 14, delete "uencies" and insert --frequencies--.

In column 5, at line 15 after "contains the" insert --CPU--.

Signed and Sealed this

Twenty-ninth Day of May, 2001

*Attest:*

NICHOLAS P. GODICI

*Attesting Officer*   *Acting Director of the United States Patent and Trademark Office*